(12) United States Patent
Roy

(10) Patent No.: US 11,544,663 B2
(45) Date of Patent: Jan. 3, 2023

(54) PACKAGE RECEIVING STATION

(71) Applicant: Switch, Ltd., Las Vegas, NV (US)

(72) Inventor: Rob Roy, Las Vegas, NV (US)

(73) Assignee: Switch, Ltd., Las Vegas, NV (US)

( * ) Notice: Subject to any disclaimer, the term of this patent is extended or adjusted under 35 U.S.C. 154(b) by 0 days.

(21) Appl. No.: 15/888,522

(22) Filed: Feb. 5, 2018

(65) Prior Publication Data

US 2018/0225628 A1    Aug. 9, 2018

Related U.S. Application Data

(60) Provisional application No. 62/454,599, filed on Feb. 3, 2017.

(51) Int. Cl.
*G06Q 10/08* (2012.01)
*A47G 29/14* (2006.01)
(Continued)

(52) U.S. Cl.
CPC ....... *G06Q 10/0836* (2013.01); *A47G 29/141* (2013.01); *B64C 39/024* (2013.01);
(Continued)

(58) Field of Classification Search
CPC ....... G06Q 10/063116; G06Q 10/0832; G06Q 10/0834; G06Q 30/06; G06F 16/9038;
(Continued)

(56) References Cited

U.S. PATENT DOCUMENTS

| | | | |
|---|---|---|---|
| 10,039,401 B1 * | 8/2018 | Romanucci | A47C 7/628 |
| 2003/0127504 A1 * | 7/2003 | Hill | A47G 29/1201 |
| | | | 232/24 |

(Continued)

FOREIGN PATENT DOCUMENTS

| | | | | |
|---|---|---|---|---|
| CN | 205831604 U | * | 12/2016 | |
| WO | WO-2016013937 A1 | * | 1/2016 | G07F 17/13 |
| WO | WO-2016163779 A1 | * | 10/2016 | A47G 29/12 |

OTHER PUBLICATIONS

Rottner Trend Steel PostBox, Rottner, Apr. 12, 2016 (Year: 2016).*
(Continued)

*Primary Examiner* — Jeff Zimmerman
*Assistant Examiner* — Brian Adams Heflin
(74) *Attorney, Agent, or Firm* — Weide & Miller, Ltd.

(57) ABSTRACT

Package delivery to homes or after-hours business delivery exposes a package to theft, weather damage, and extreme temperatures. To receive and protect delivered packages, a package receiving station is configured to receive package from delivery vehicles. The station includes walls that extend upward to create an interior space of the station and a roof or other movable portion that is moveable between a first position covering the interior space and a second position allowing access to the interior space. A motor causes movement of the moveable roof or movable portion and an access portal in the wall allows access into the interior space to retrieve the package. A receiver receives a signal from or detects the arrival of the delivery vehicle and generates a control signal. A controller, responsive to the control signal, sends an activation signal to the motor to move the moveable roof or movable portion.

20 Claims, 5 Drawing Sheets

(51) Int. Cl.
*G07C 9/00* (2020.01)
*B64C 39/02* (2006.01)

(52) U.S. Cl.
CPC ... *G06Q 10/08355* (2013.01); *G07C 9/00912* (2013.01); *A47G 2029/145* (2013.01); *A47G 2029/147* (2013.01); *B64C 2201/128* (2013.01); *G07C 2009/0092* (2013.01)

(58) Field of Classification Search
CPC .... H04Q 11/0407; E04H 17/00; A47G 29/00; A47G 29/12; A47G 29/14
See application file for complete search history.

(56) References Cited

U.S. PATENT DOCUMENTS

| | | | |
|---|---|---|---|
| 2007/0151150 A1* | 7/2007 | Sandoval | A01G 9/02 47/66.1 |
| 2016/0025365 A1* | 1/2016 | Moudy | H04W 4/025 700/276 |
| 2016/0033966 A1* | 2/2016 | Farris | A47G 29/122 701/15 |
| 2016/0374494 A1* | 12/2016 | Geng | A47G 29/16 232/17 |
| 2017/0091710 A1* | 3/2017 | Van Dyke | G05D 1/101 |
| 2017/0116568 A1* | 4/2017 | Pleis | G06Q 10/0832 |
| 2017/0203857 A1* | 7/2017 | O'Toole | B64D 1/12 |
| 2017/0228692 A1* | 8/2017 | Pargoe | B65D 43/16 |
| 2017/0233135 A1* | 8/2017 | Schwimmer | B65D 19/0095 206/599 |
| 2017/0286905 A1* | 10/2017 | Richardson | G06Q 10/0832 |

OTHER PUBLICATIONS

"Google Drops New Hint About its Drone Delivery Service," by Jonathan Vanian, Jan. 27, 2016 (Year: 2016).*

* cited by examiner

PACKAGE RECEIVING STATION

PRIORITY CLAIM

This application claims priority to and the benefit of U.S. Provisional Patent Application No. 62/454,599 filed on Feb. 3, 2017, entitled Package Receiving Station, which application is expressly incorporated by reference herein.

BACKGROUND

1. Field of the Invention

This innovation relates to package delivery and in particular, to a method and apparatus for receiving, storing and protecting packages and items delivered via drone or other autonomous or remotely controlled vehicle.

2. Related Art

It is generally understood that online commerce is a popular method for individuals and businesses to sell and purchase goods. In a typical transaction, a purchaser orders goods from an online web site or by phone and the seller ships the goods, in exchange for payment, to the purchaser. To send the goods to the purchaser, the seller typically delivers the goods themselves or employs a third-party delivery service, such as United Postal Service (UPS), United States Postal Service (USPS), or Federal Express. In either event, the delivery typically requires that the goods be packaged, placed in a vehicle, and driven to the address indicated by the purchaser and placed on the front porch if the residence or business or left with a receptionist or any other employee or person in the building.

This process has numerous drawbacks beyond those associated with the cost, expense, and pollution of a delivery vehicle. One proposed solution is to utilize flying autonomous or remotely piloted vehicles (such as drones) (individually, a "drone" and collectively, "drones") to avoid use of vehicles driven by humans. However, this does not solve many of the problems associated with package delivery. For example, once delivery of the package occurs, it is often left on a front porch or outside area near a building. In hot environments, the package can overheat causing damage or spoilage to items such as food, medicine, cosmetics, and other products. In cold environments, the goods can freeze, which can cause damage to these same types of products and also to batteries and electronics. In addition, weather, such as rain and snow, can damage the delivered goods, even when the temperature is moderate.

A further drawback to prior art delivery methods is risk of theft of the package or the drone, particularly in neighborhoods that suffer from high crime rates. This aspect is particularly troubling because it can prevent residents in these neighborhoods from gaining the benefits, such as the time and cost savings, that can be realized by online shopping and efficient delivery.

Yet another drawback is a lack of accountability concerning package delivery. If a package is missing when the purchaser arrives at the building where the package was delivered, there is no reliable way to determine if the package was simply not delivered, was delivered but stolen, or if the purchaser did in fact receive the package, and is dishonestly asserting that they did not receive the package.

All of the foregoing aspects are drawbacks to prior art package delivery methods. The innovation disclosed below overcomes the drawbacks associated with the prior art.

SUMMARY

To overcome the drawbacks of the prior art and provide additional benefits, a package receiving station is disclosed. In one example embodiment, the package receiving station is configured to receive packages from autonomous delivery vehicles. The station includes a support structure extending vertically upward, that defines an interior space of the station. A moveable roof is supported by the support structure. The moveable roof is movable between a first position covering the interior space and a second position allowing access to the interior space. An access control element is associated with the station that allows access to the package after delivery by the autonomous delivery vehicle.

In one configuration the support structure is three or more walls and the access control element is a door. In another embodiment the support structure is posts and the station further comprises fencing between the posts. The access control device may be a door or gate with locking capability. The station may include a receiver configured to receive a signal from an autonomous delivery vehicle, and responsive to the signal, activate one or more motors or actuators configured to move the movable roof to the second position to allow the package to be deposited in the interior space by the autonomous delivery vehicle. The movable roof is configured to return to the first position after a package is received in the interior space from an autonomous delivery vehicle. In one configuration, the station further comprises one or more cameras configured to capture images of the interior space of the station.

Also disclosed herein is a package receiving station configured to receive a package from delivery vehicles. The station comprises walls that extend upward to create an interior space of the station and a moveable portion. The moveable portion is movable between an open position for receiving the package and a closed position securing the package in the interior space. A motor is configured to cause movement, of the moveable portion, between the open position and the closed position. A receiver is provided and is configured to receive a signal from or detect the delivery vehicle when the delivery vehicle is delivering a package to the station and in response thereto generate a control signal. A controller is configured to receive the control signal from the receiver and, responsive to the control signal, send an activation signal to the motor to move the moveable portion from the closed position to the open position for delivery of the package.

In one configuration the movable portion is a movable roof which is mounted on rails that facilitate movement of the moveable portion along the rails. The station may also include a detector configured to detect a package or provide a visual image of the interior space of the station. The station may further comprise a net or padding on the interior of the station to provide cushion for the package. The station may also include a door associated with the station that allows access into the interior space of the station to retrieve the package after delivery. In one embodiment, the controller is further configured to send a second control signal to the motor to move the movable portion from the open position to the closed position after delivery of the package to secure the package in the station's interior.

Also disclosed herein is a method for receiving a package at a package receiving station when the package is delivered by an unmanned delivery vehicle. In one example embodiment, this method comprises providing a package receiving station such that the station has or defines an interior area. Receiving a signal from the delivery vehicle or detecting approach of the delivery vehicle and then, responsive to the signal from the delivery vehicle or upon detecting approach of the delivery vehicle, generating a control signal to open a portion of the station to receive the package. Presenting the control signal to a motor or other actuator to open a portion of the station and then receiving the package from the delivery vehicle at the open portion of the station. This method also presents another control signal to a motor or other actuator to close the portion of the station.

This method may further comprise detecting delivery of the package in the interior of the station and sending a message to a package recipient of the delivery. The message may include a photo. A message and/or photo may also be sent to the package sender. In one configuration, the station includes a camera and the camera sends a picture of the delivery to the package recipient. It is contemplated that the portion of the station that opens is a drawer, shelf, or bin. In one configuration the signal from the delivery vehicle includes a code that is specific to the station. As discussed herein the portion of the station that opens is a roof or a portion of a roof of the station. In one embodiment this method further comprises monitoring a temperature of the interior of the station and activating a heating or cooling device in response to the temperature being beyond a threshold.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Disclosed herein is a drone delivery package receiving and storage station (a "station") that overcomes the drawbacks of the prior art. In one or more various embodiments, the station provides a space to receive package(s) from a drone (aerial or land based) or delivery person by providing an enclosed or semi-enclosed space that may be environmentally controlled and secure. One or more electrical facilities 130 are associated with the station to provide additional services.

Figure 1A:
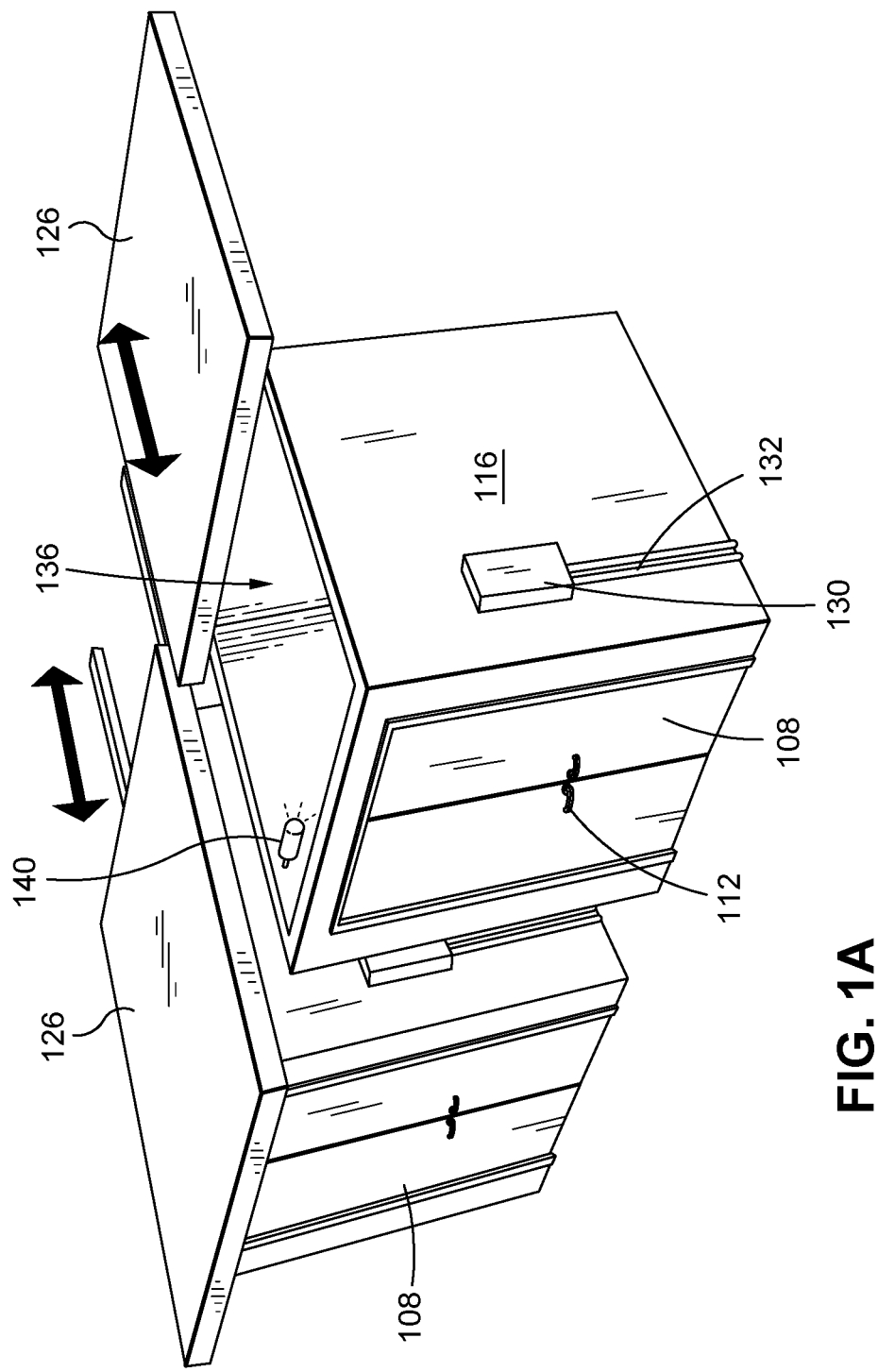
FIG. 1A is a perspective view of a package receiving and storage station.
Figure 1B:
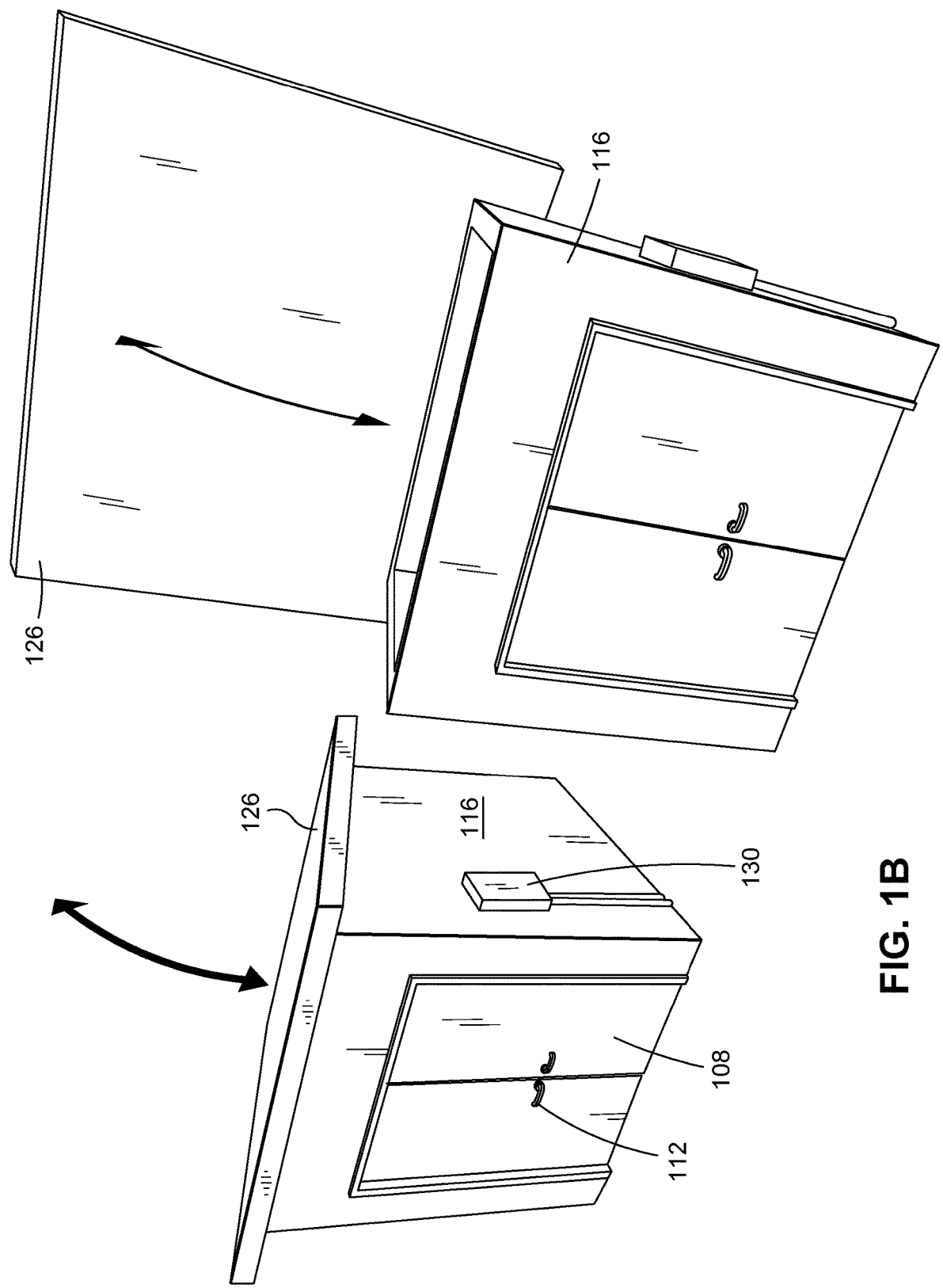
FIG. 1B is a perspective view of one alternative embodiment of a package receiving and storage station.

FIG. 1A and FIG. 1B illustrates several different package receiving and storage stations. FIG. 1A shows a structure with one or more access points. In FIG. 1A, the access points include a side door 108 and a movable roof portion 126, that is movable between a first position and a second position. In this embodiment, the roof 126 is generally flat or sloped to address accumulation of undesired items such as water, snow and foliage and to facilitate drainage. The roof 126 may ride on rails, hinges, magnets, or other supports as it moves generally horizontally or vertically from a first position to a second position.

Supporting the roof 126 and the door 108 are one or more walls or other side support structures, such as fences, panels, barriers, glass, or any other material. For example, the supports may comprise walls, or support structures, such as posts or columns, with fencing or other barrier spanning between the support structures. In this embodiment the walls are generally ridged and can include insulation and an outer protective and access resistant barrier made of typical building materials, such as siding, stucco, brick or sheet metal. In other embodiments, the walls may be formed from a variety of other materials including fencing, tert material, fabric, plastic, or any other material. It is also contemplated that the station may be pre-fabricated or partially pre-fabricated and shipped to the installation site for placement or assembly and placement.

The side door 112 may be any type door, such as is traditional in the building art, that includes a hinge, door handle, and locking mechanism. The door can also be a roll up type which can facilitate access for non-flight based delivery such wheeled drones and delivery persons. The door lock may be keys, combination, and/or electronic. It is contemplated that the side doors may be opened by delivery persons or wheel drones to place packages inside the station, such as with a code, or electronic opening key fob, RFID, Bluetooth or wireless code. Such activities can track, in a database, the door activity and the party or entity opening the door or activating the door opening in an autonomate access embodiment.

Similarly, the roof 126 may be opened to accept packages and then closed to maintain a weather tight and secure environment. The roof may be opened manually or automatically, such as upon arrival of a drone to expose the internal netting for safe receipt of the package. In one example embodiment, the roof or door is activated by a control system (discussed below in greater detail) that sends a signal upon arrival of a flying or wheeled drone to open the roof or door to accept the drone, the package or both. Upon the drone depositing the package and leaving the area, the roof or door will automatically close in response to a control signal from the control system. On additional advantage of having a moveable roof which provides access to a package deposit area is that it maintains the drone, and its spinning rotors, above ground based life forms such as humans and pets, and enclosed behind a wall away from such life forms. This increases safety for the ground based life forms, and the drone.

It is contemplated that the package receiving station may be any size. The size of most packages is less than 3 feet by 3 feet and even less than 2 feet by 2 feet in size. It is thus contemplated that the package receiving station may likewise be small in size and configured to accept small packages, such as would be delivered by aerial drone. Large package receiving stations are also contemplated that are more the size of a shed or small building. It is also contemplated that the package receiving station may be built from traditional building materials or modular in design and thus packable in one or more boxes thus allowing a user to assemble the package receiving station themselves either at the front of their house, in their backyard, or on a deck or patio.

It is also contemplated that the package receiving station may be incorporated with other structure in a dual use format. For example, an upper portion of a structure may be the package receiving station while the lower portion is a tool shed or dog house. A mail box may also be combined with the package receiving station thereby serving a dual purpose.

It is further contemplated that instead of having the roof be movable, a shelf, drawer, or bin may be exposed by sliding, rotation or other movement to expose a location for the package to be deposited by the delivery vehicle, such as for example an autonomous aerial drone or wheeled vehicle. Thus, instead of the roof moving, a drawer, shelf or bin may extend outward to provide a location for the package. After delivery the drawer, shelf or bin may retract or rotate back into the interior space. This avoids the need for a moveable roof and would maintain the structural and weather resistance of a fixed roof structure. Motor and rails, hinges, or swivels may be used to facilitate movement of the drawer, shelf or bin.

Thus, the station provides a location for safe and protected package receipt. The interior of the station can contain either netting, cushions, or other shock absorbing, water-proof materials (the "netting") in the receiving bay, which netting provides for a more gentle receipt of the drone delivered packages. This netting allows for delivery from variable heights above the station and ensures that even fragile packages are delivered without damaging or threatening the integrity of the materials being delivered. The roof of the station opens to expose the cushioning when the drone is within sufficient proximity to ensure reduced exposure to adverse elements or security threats, and resumes the closed and secured position once the materials or package has been delivered.

Both or either of the side door and the roof may be manually operated or motorized and automated. In one embodiment, hydraulics are used to move the roof. Thus, it may be opened without human intervention such that a delivery device may be able to automatically unlock and open a station door to deposit a package. The side door may likewise be equipped with a platform or shelf (not shown) that can be controlled to extend from the side doors of the building. For example, the side doors to the building may open outward, such that if the side doors are unlocked, an internal shelf could put the door open, thereby establishing a shelf or platform external to the structure for an aerial or wheeled drone to set the package. After delivery, the aerial or wheeled drone, through an electronic interface, or due to action by a human delivery driver, to close the shelf and the side doors. In such an embodiment it is contemplated that the roof may be fixed and not movable.

The interior 136 of the station may have a padded floor or walls, or a net to maintain the package off the floor and to provide a padded or soft area for the package to enter and come to rest within the station. In one embodiment, the package is lowered into the interior 136 of the station by the drone while in other embodiments the drone may enter the station interior and release the package on the floor or a net. In other embodiments, the package may be dropped into the station while the drone is above and outside the station onto the netting in the interior of the station.

The station may be equipped with power and communication facilities 130, which may be provided via underground cables 130. The station may also have wireless communication capability, wireless or solar powered capabilities, or a small generator, and in all configurations battery power storage is contemplated as an option. Power may be provided to run lighting and environmental control devices, such as heat and cooling and to power other elements at the station. The station may include a heating, ventilation and air conditioning ("HVAC") system to maintain a minimum and maximum temperature in the station. The HVAC system may include a heater and/or air cooling system and/or humidity or other environmental controls. The station may thus have a climate controlled interior. One or more lights may also be provided to illuminate the interior and/or exterior of the station. Among other things, these lights could be utilized to signal that a package has been delivered, or to warn people proximate to the station that a drone is approaching. The station may also provide signals via a communication network, such as wired connection, cellular service or the internet, of delivery of a package or arrival of a drone.

The communication systems may include wired or wireless communication capability such as through the facilities 130 or through an antenna built into the building or contained in the station. Numerous contemplated different types of communication systems or standards are discussed below.

The station is also equipped with numerous electronic devices. One such device is a drone detection system that detects an incoming drone, and in response thereto, open the roof 126 or other area of the station to receive the package. The drone detection system may comprise a receiver to receive a wireless notification or alert signal from the drone, or a microphone that detects a sound signature, radar, or a camera based system that uses optical device recognition to detect the drone. The drone may be configured to transmit a signal to the station that controls the station to open the roof to accept the arriving drone. Thus, the drone may have a transmitter that transmits a signal that is received by the station.

Also part of the station may be one or more cameras 140 that capture the interior of the building or the drone arrival/ departure. A wireless or wired internet or network connection may also be part of the station to transmit and receive data as is understood in the networking art. The camera may be used to verify that the package is in the station for the sender and the recipient. The image captured by the camera may be transmitted to a remote location such as over the Internet as proof of delivery. Other sensors may be provided that may detect the package, such as radar or RFID activators and sensors.

The station may also be equipped with one or more locks, alarms and alerts. The alarms may be triggered if the temperature exceeds or falls below preset thresholds. The Alarms may be triggered if the station is broken into, vandalized or a lock is disturbed. This can send alarms to the shipper and the receiver of the goods or station owner.

It is contemplated that the station may be individually possessed or shared by two or more residences, individuals, or businesses. Each user may have a code and a camera may monitor ingress and egress to the station and track who picks up which package and when. Such monitoring is intended to prevent theft. This arrangement saves on the cost and space allocation required for a station. In this arrangement, the station could be configured with multiple rooms and doors which are under a common roof, thereby allowing multiple rooms each with a separate door. Each business or residence might share the station, but each residence or business would have controlled access to only their locked compartment.

In one embodiment, the station may be divided into multiple parts such as one portion being maintained at a room temperature of above while the other compartment is maintained as a cold storage area to store food, medicine or other temperature sensitive items. It is contemplated that the HVAC system could be selectively or automatically controlled to adjust the temperature to the nature of the goods within the station. For example, if a person is expecting a food delivery, they can manually adjust the temperature to a refrigerator temperature, about 38 degrees. If a restaurant or home is receiving a midnight delivery of frozen or fresh seafood, then they can adjust the temperature downward. Alternatively, if the drone is programmed with the content of package being delivered, it can automatically communicate the computer that controls the station to adjust the temperature within the station accordingly, namely downward for food, medicine, or other particular items. It is further contemplated that the station could also be part of, or integral with an unrelated function such as a dog house or other pet house, a back yard shed, or garage, or child's play house.

It is also contemplated that the roof may provide a location for the drone to land, such as a landing pad, and the package may be left there, or dropped or moved into the station after the drone departs.

FIG. 1B illustrates an alternative embodiment with a roof that opens in a different manner. In this embodiment, the roof opens upwardly in an arc due to the roof being hinged at the back side. This arrangement requires less space behind the station due to the angle of the roof. This arrangement, with an angled roof, is well suited to environments with snow because it allows the snow to be shed from the roof, due to the angle, and allows the roof to be opened without significant snow that is on the roof from falling into the station interior. There is also benefit to this embodiment in vegetated areas where plant debris could interfere with station operation.

In other embodiments, the shape of the station may be other than a generally box shape such as but not limited to A-frame shaped with a two angle opposing roof panels that open outward to expose the interior of the A-Frame. Other shapes may be round, oval, pyramid, or any other shape or nature.

Figure 2:
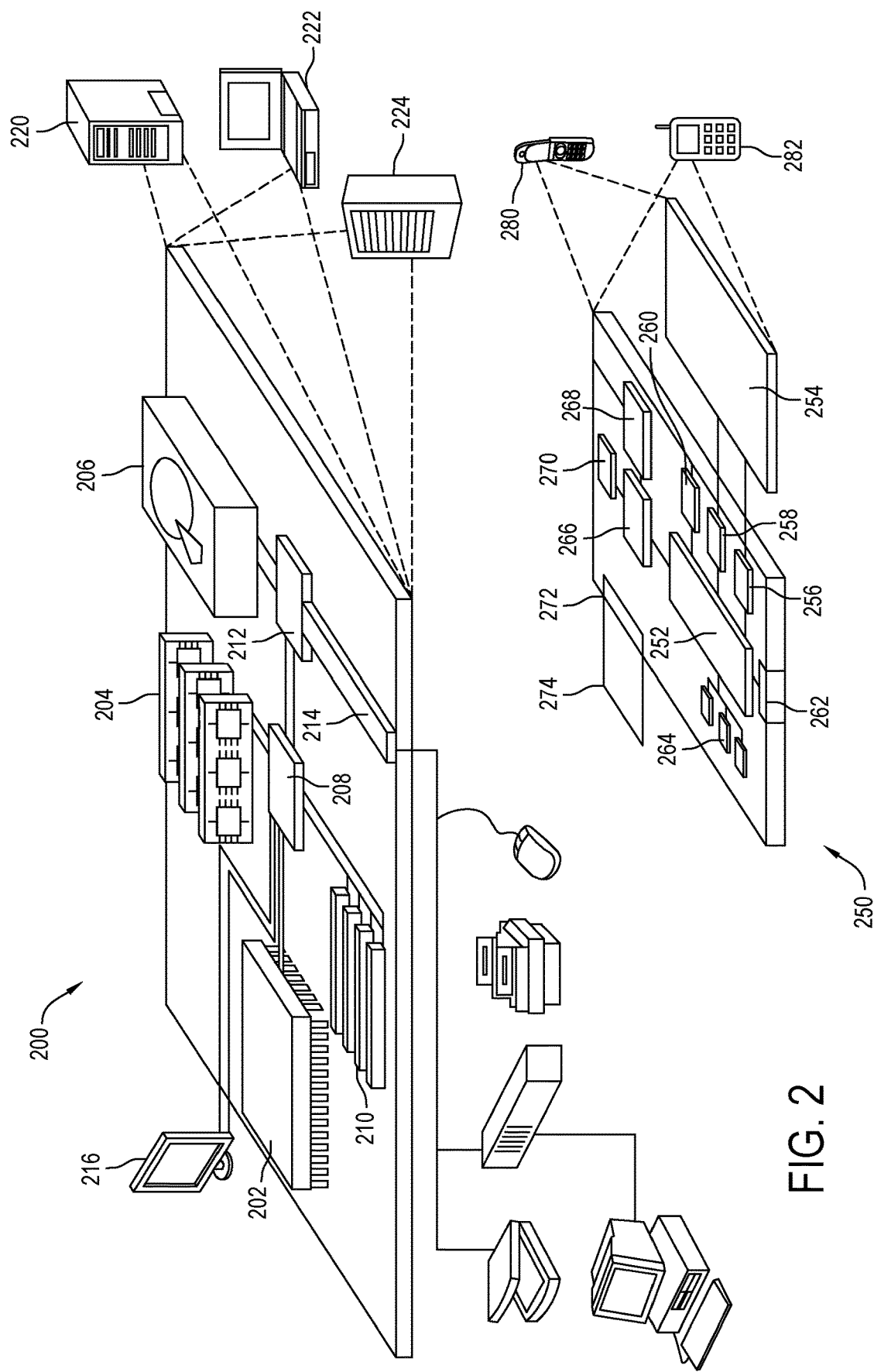
FIG. 2 is a block diagram showing example or representative computing devices and associated elements that may be used to implement the systems method and apparatus described herein.

FIG. 2 is a block diagram showing example or representative computing devices and associated elements that may be used to implement the systems method and apparatus described herein. The system of FIG. 2, or only a portion thereof, may be located in or near the receiving station to perform communication and control functions. FIG. 2 shows an example of a generic computing device 200 and a generic mobile computing device 2250, which may be used with the techniques described here. Computing device 200 is intended to represent various forms of digital computers, such as laptops, desktops, workstations, personal digital assistants, servers, blade servers, mainframes, and other appropriate computers. Computing device 250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 200 includes a processor 202, memory 204, a storage device 206, a high-speed interface or controller 208 connecting to memory 204 and high-speed expansion ports 210, and a low-speed interface or controller 212 connecting to low-speed bus 214 and storage device 206. Each of the components 202, 204, 206, 208, 210, and 212, are interconnected using various busses, and may be mounted on a common motherboard or in other manners as appropriate. The processor 202 can process instructions for execution within the computing device 200, including instructions stored in the memory 204 or on the storage device 206 to display graphical information for a GUI on an external input/output device, such as display 216 coupled to high-speed controller 208. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

The memory 204 stores information within the computing device 200. In one implementation, the memory 204 is a volatile memory unit or units. In another implementation, the memory 204 is a non-volatile memory unit or units. The memory 204 may also be another form of computer-readable medium, such as a magnetic or optical disk.

The storage device 206 is capable of providing mass storage for the computing device 200. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, or memory on processor 202.

The high-speed controller 208 manages bandwidth-intensive operations for the computing device 200, while the low-speed controller 212 manages lower bandwidth-intensive operations. Such allocation of functions is exemplary only. In one implementation, the high-speed controller 208 is coupled to memory 204, display 216 (e.g., through a graphics processor or accelerator), and to high-speed expansion ports 210, which may accept various expansion cards (not shown). In the implementation, low-speed controller 214 is coupled to storage device 206 and low-speed bus 214. The low-speed bus 214, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 200 may be implemented in a number of different forms, as shown in the figure. For example, it may be implemented as a standard server 220, or multiple times in a group of such servers. It may also be implemented as part of a rack server system 224. In addition, it may be implemented in a personal computer such as a laptop computer 222. Alternatively, components from computing device 200 may be combined with other components in a mobile device (not shown), such as device 250. Each of such devices may contain one or more of computing device 200, 250, and an entire system may be made up of multiple computing devices 200, 250 communicating with each other.

Computing device 250 includes a processor 252, memory 264, an input/output device, such as a display 254, a communication interface 266, and a transceiver 268, among other components. The device 250 may also be provided with a storage device, such as a microdrive or other device, to provide additional storage. Each of the components 250, 252, 264, 254, 266, and 268, are interconnected using various busses, and several of the components may be mounted on a common motherboard or in other manners as appropriate.

The processor 252 can execute instructions within the computing device 250, including instructions stored in the memory 264. The processor may be implemented as a chipset of chips that include separate and multiple analog and digital processors. The processor may provide, for example, for coordination of the other components of the device 250, such as control of user interfaces, applications run by device 250, and wireless communication by device 250. The wireless communication devices 250 may send and/or receive signals from a delivery vehicle to indicate an incoming delivery or that a delivery is finished. A detector may also or alternatively used in addition to or instead of the receiver and the detector may be part of and communicate with the elements shown in FIG. 2.

Processor 252 may communicate with a user through control interface 258 and display interface 256 coupled to a display 254. The display 254 may be, for example, a TFT LCD (Thin-Film-Transistor Liquid Crystal Display) or an OLED (Organic Light Emitting Diode) display, or other appropriate display technology. The display interface 256 may comprise appropriate circuitry for driving the display 254 to present graphical and other information to a user. The control interface 258 may receive commands from a user and convert them for submission to the processor 252. In addition, an external interface 262 may be provided in communication with processor 252, so as to enable near area communication of device 250 with other devices. External interface 262 may provide, for example, for wired communication in some implementations, or for wireless communication in other implementations, and multiple interfaces may also be used.

The memory 264 stores information within the computing device 250. The memory 264 can be implemented as one or more of a computer-readable medium or media, a volatile memory unit or units, or a non-volatile memory unit or units. Expansion memory 274 may also be provided and connected to device 250 through expansion interface 272, which may include, for example, a SIMM (Single In Line Memory Module) card interface. Such expansion memory 274 may provide extra storage space for device 250, or may also store applications or other information for device 250. Specifically, expansion memory 274 may include instructions to carry out or supplement the processes described above, and may include secure information also. Thus, for example, expansion memory 274 may be provide as a security module for device 250, and may be programmed with instructions that permit secure use of device 250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 264, expansion memory 274, or memory on processor 252, that may be received, for example, over transceiver 268 or external interface 262.

Device 250 may communicate wirelessly through communication interface 266, which may include digital signal processing circuitry where necessary. Communication interface 266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 268. In addition, short-range communication may occur, such as using a Bluetooth, Wi-Fi, or other such transceiver (not shown). In addition, GPS (Global Positioning system) receiver module 270 may provide additional navigation- and location-related wireless data to device 250, which may be used as appropriate by applications running on device 250.

Device 250 may also communicate audibly using audio codec 260, which may receive spoken information from a user and convert it to usable digital information. Audio codec 260 may likewise generate audible sound for a user, such as through a speaker, e.g., in a handset of device 250. Such sound may include sound from voice telephone calls, may include recorded sound (e.g., voice messages, music files, etc.) and may also include sound generated by applications operating on device 250.

The computing device 250 may be implemented in a number of different forms, as shown in the figure. For example, it may be implemented as a cellular telephone 280. It may also be implemented as part of a smart phone 282, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 200 and/or 250) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 200 and 250 are configured to receive and/or retrieve electronic signal and commands from various other computing devices connected to computing devices 200 and 250 through a communication network, and store these electronic signals within at least one of memory 204, storage device 206, and memory 264. Computing devices 200 and 250 are further configured to manage and organize these electronic signals within at least one of memory 204, storage device 206, and memory 264 using the techniques described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "identifying" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

Figure 3:
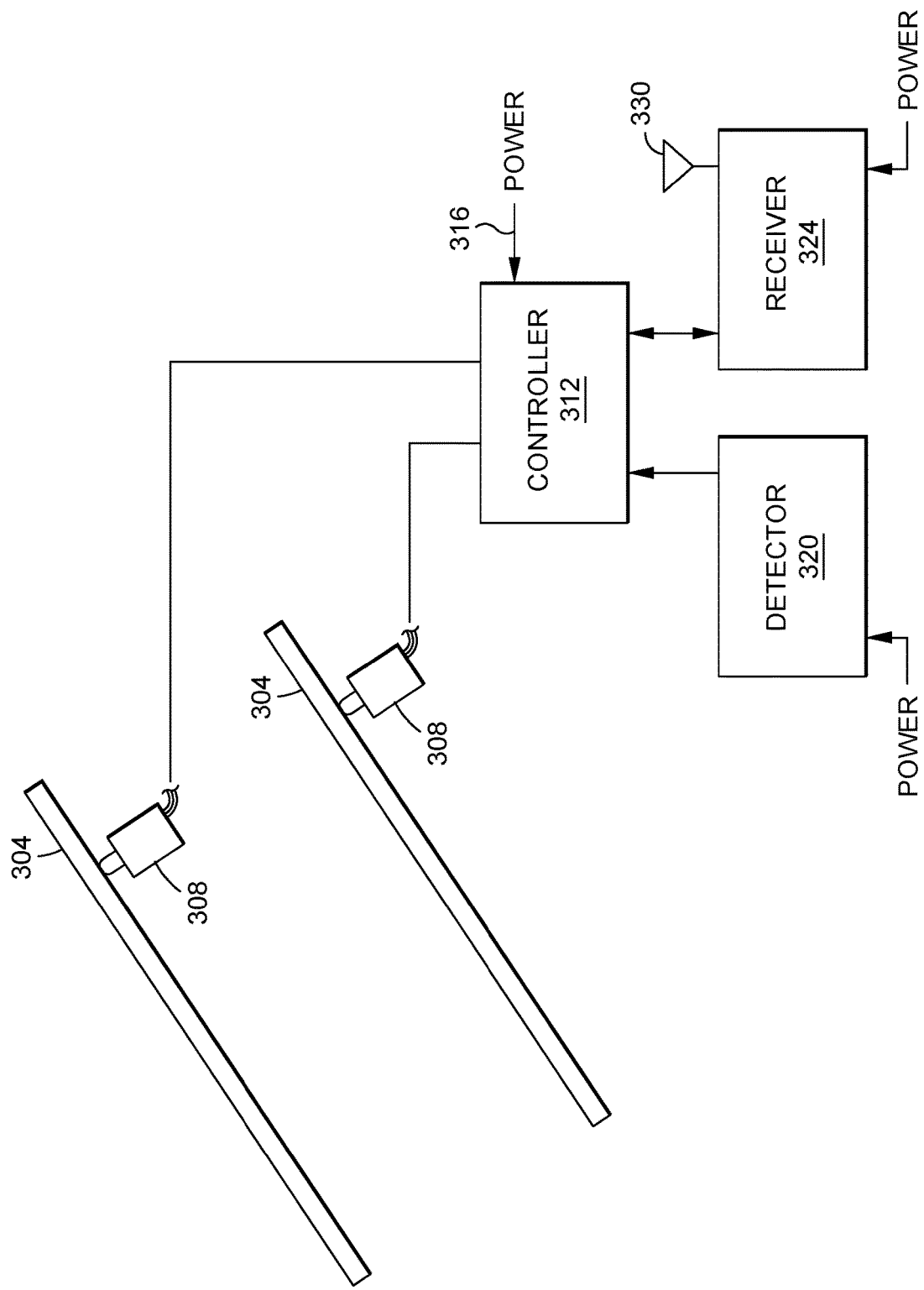
FIG. 3 illustrates an example arrangement of a roof or shelf portion moving system.

FIG. 3 illustrates an example arrangement of a roof or shelf portion moving system. This is but one possible arrangement of elements and one of ordinary skill in the art may create different configurations without departing from the scope of the claims. As shown, the roof or other movable portion may be mounted on one or more supporting rails 304 that support the movable portion. To effect movement of the movable portion of the station, one or more motors 308 are arranged to move the rails or the movable portion. The motors 308 received activation signals from a controller 312 to open or close the movable portion to provide access to the station interior so that the station may receive a package. The control 312, as well as other components of the station, receive power 316 from a power grid or batteries. The station may include solar power generating capacity.

The controller 312 receives control signals from a detector 320 and/or a receiver 324. The detector 320 and/or receiver 324 generates the control signals in response to the approach of a delivery vehicle, such as an aerial drone. In the case of the detector 320, it is configured to detect the approach of the delivery vehicle, such as by image recognition, audio analysis, proximity sensor or any other means. In the case of the receiver 324, it is configured to receive a wireless signal from the delivery vehicle of the arrival of a delivery. The receiver 324 may be configured with an antenna 330. In both instances, a control signal is sent to the controller 312 to cause the movable portion to move.

Figure 4:
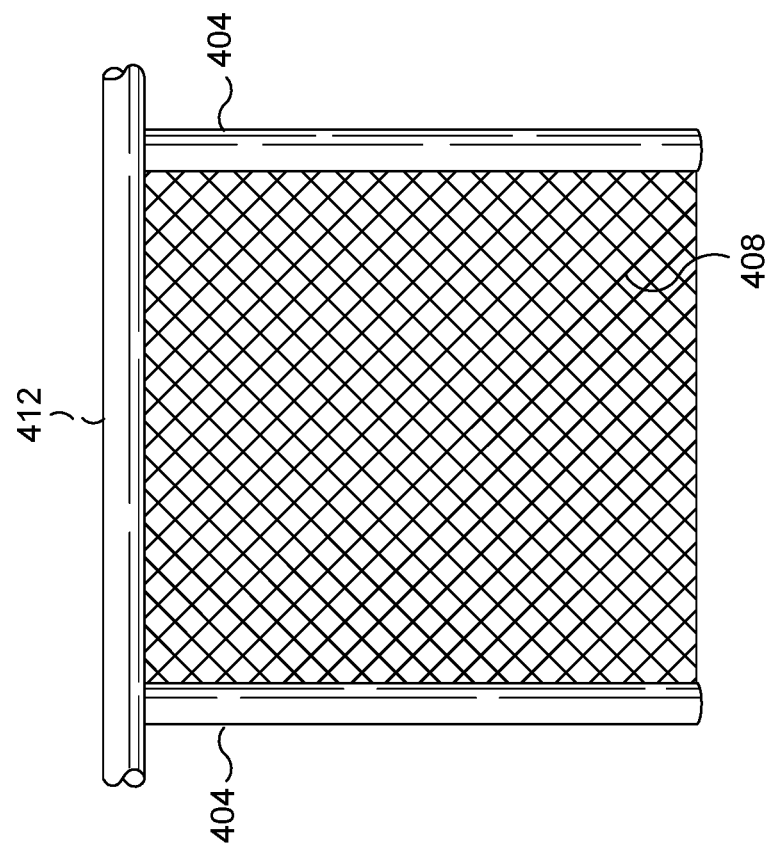
FIG. 4 illustrates an exemplary fence panel system for use in construction of the station.

FIG. 4 illustrates an exemplary fence panel system for use in construction of the station. To reduce the cost, weight, complexity and buildability of the station, the walls may be made of any type of material including fencing or lightweight prefabbed panels. In this embodiment the walls are made from fence posts 404 or other support structures such as poles, and spanning between the posts 404 is fencing 408 that may be of any type from flexible poly fence, chain link, bars, wood slats, covered panels or any other type of material. An optional top post 412 may be provided for structural integrity. An additional post or rod may be placed along the bottom of the fence 408 for additional support and security. Using posts and fencing makes the station lighter, less expensive, and capable of being built by homeowners without extensive construction experience. The stations can be shipped in one or more boxes. Likewise, preformed plastic panels may be used to form the station.

Figure 5:
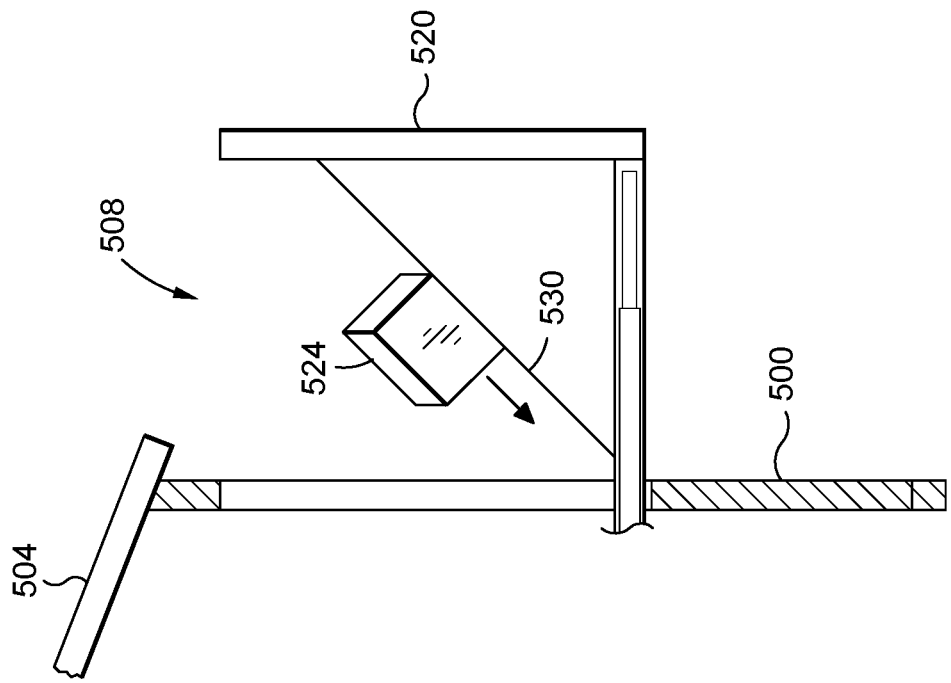
FIG. 5 illustrates an example embodiment of a movable portion of the station.

FIG. 5 illustrates an example embodiment of a movable portion of the station. In contrast to the roof 504 moving, a shelf, bin or drawer 520 may extend outward from the station wall 500 to expose a location 508 for the package 524 to be deposited by the delivery vehicle, whether wheeled or aerial. A motor or other movement causing device may move the shelf, bin or drawer 520 outward. An optional sloping ramp 530 may be part of the shelf, bin or drawer 520 which in turn causes the package 524 to slid downward into the station interior thus freeing up space in the shelf, bin or drawer for an additional package delivery. Although shown as a drawer that moves horizontally, the movable portion could rotate outward.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A package receiving station configured to receive packages from autonomous delivery vehicles comprising:
   a support structure, extending vertically upward, that defines an interior space of the station, the support structure including a door to allow access to the interior space through a side of the support structure;
   a moveable roof, supported by the support structure, the moveable sloped roof movable between a first position covering the interior space and a second position allowing access to the interior space;
   an access control element associated with the station that allows access to the package after delivery by the autonomous delivery vehicle;
   a controller configured to selectively open and close the moveable roof in response to receiving a first signal from the autonomous delivery vehicle that is specific to the station;
   the interior space of the station is humidity controlled;
   wherein the support structure is posts and the station further comprises fencing between the posts to thereby limit access to the interior space;
   wherein the station includes a receiver configured to receive the first signal from an autonomous delivery vehicle, and responsive to the first signal, provide a second signal to the controller to activate one or more motors or actuators that are configured to move the movable roof to the second position to allow the package to be deposited in the interior space by an autonomous delivery vehicle; and
   wherein the station comprises one or more cameras configured to capture and send a picture of the interior space of the station during delivery to the package recipient, the package sender, or both; and
   wherein the package receiving station has a first portion maintained at a first temperature and a second, different portion maintained at a second temperature different than the first temperature.

2. The station of claim 1 wherein the support structure is three or more walls and the access control element is a door through one of the three or more walls.

3. The station of claim 1 wherein the access control element is a door or gate with locking capability.

4. The station of claim 1 wherein the movable roof is configured to return to the first position after a package is received in the interior space from an autonomous delivery vehicle.

5. A package receiving station configured to receive a package from a delivery vehicle, the station comprising:
   walls that extend upward to create and surround an interior space of the station, at least one wall comprising a door to allow access to the interior space through the wall;
   a moveable portion of the station, the moveable portion pivoting at or near a pivoting side of the movable portion while an opposing side extends upward from the stations in an arc, around the pivoting end, between an open position for receiving the package and a closed position for securing the package in the interior space;
   a motor configured to cause movement, of the moveable portion, between the open position and the closed position;
   a receiver configured to receive a signal that is specific to the station from the delivery vehicle when the delivery vehicle is delivering a package to the station and in response thereto to generate a control signal;
   a controller configured to receive the control signal from the receiver and, responsive to the control signal, send an activation signal to the motor to move the moveable portion from the closed position to the open position for delivery of the package;
   the interior space of the station is humidity controlled;
   a support structure comprising posts and fencing between the posts to thereby limit access to the interior space;
   wherein the station comprises one or more cameras configured to capture and send a picture of the interior space of the station during delivery to the package recipient, the package sender, or both, and
   wherein the package receiving station is incorporated in a dual use manner with a structure selected from the group consisting of a shed, a dog house, a mail box, a play house, and a garage.

6. The station of claim 5 wherein the movable portion is a movable roof which is mounted on rails or hinges, the rails or hinges connected to the roof and configured to facilitate movement of the roof along the rails.

7. The station of claim 5 further comprising a detector configured to detect a package in the interior space or provide a visual image of the interior space of the station.

8. The station of claim 5 further comprising a net or padding on the interior of the station to provide cushion for the package.

9. The station of claim 5 wherein the controller is further configured to send a second control signal to the motor to move the movable portion from the open position to the closed position after delivery of the package to secure the package in the interior of the station.

10. A method for receiving a package at a package receiving station, delivered by an unmanned delivery vehicle, comprising:
    providing a package receiving station, the station comprising a support structure defining an interior space of the station, a moveable sloped roof, supported by the support structure, a light, on the exterior of the station, configured to illuminate when a package is in the station, a drawer coupled to a wall of the support structure and being separate from the moveable sloped roof, the drawer having a sloping ramp, wherein, while the drawer is in an open position, the drawer is structured to cause the package to slide downward into the interior, thereby freeing up space in the drawer for an additional delivery, the support structure comprising a door in a side of the support structure to allow access to the interior space;

receiving a signal from the delivery vehicle or detecting approach of the delivery vehicle; responsive to the signal from the delivery vehicle or detecting approach of the delivery vehicle, generating a control signal to open a portion of the station to receive the package; presenting the control signal to a motor or other actuator to open a portion of the station; receiving the package from the delivery vehicle in the interior of the station;

presenting the control signal to a motor or other actuator to close the portion of the station;

wherein the signal from the delivery vehicle includes a code that is specific to the station;

controlling the humidity of the interior area of the station;

limiting access to the interior area by erecting posts and fencing between the posts; detecting delivery of the package in the interior of the station; and providing the station with a camera which sends a picture of the delivery to the package recipient, the package sender, or both, of the delivery.

11. The method of claim 10 wherein the portion of the station that opens is a drawer, shelf, or bin.

12. The method of claim 10 wherein the portion of the station that opens is a roof or a portion of a roof of the station.

13. The method of claim 10 further comprising monitoring a temperature of the interior of the station and activating a heating or cooling device in response the temperature being beyond a threshold.

14. The method of claim 10 wherein the delivery vehicle is an aerial drone configured to deliver the package.

15. The package receiving station according to claim 1, further comprising an HVAC system for maintaining the first portion at the first temperature and allowing temperature sensitive items to be stored.

16. The package receiving station according to claim 15, wherein the HVAC system is selectively or automatically controlled to adjust the first temperature.

17. The package receiving station according to claim 1, further comprising a drawer coupled to a wall of the support structure and being separate from the moveable sloped roof, the drawer having a sloping ramp, wherein, while the drawer is in an open position, the drawer is structured to cause the package to slide downward into the interior, thereby freeing up space in the drawer for an additional delivery.

18. The package receiving station according to claim 17, wherein the package receiving station is incorporated in a dual use manner with a structure selected from the group consisting of a shed, a dog house, a mail box, a play house, and a garage.

19. The package receiving station according to claim 5, wherein the package receiving station has a first portion maintained at a first temperature and a second, different portion maintained at a second temperature different than the first temperature.

20. The package receiving station according to claim 19, further comprising a drawer coupled to a wall of the support structure and being separate from the moveable sloped roof, the drawer having a sloping ramp, wherein, while the drawer is in an open position, the drawer is structured to cause the package to slide downward into the interior, thereby freeing up space in the drawer for an additional delivery.

* * * * *